(12) United States Patent
Pinals et al.

(10) Patent No.: US 12,340,638 B2
(45) Date of Patent: Jun. 24, 2025

(54) METHOD AND SYSTEM FOR OBTAINING VEHICLE FUEL EFFICIENCY

(71) Applicant: Cambridge Mobile Telematics Inc., Cambridge, MA (US)

(72) Inventors: Lisa Pinals, Cambridge, MA (US); Samuel Madden, Newton, MA (US); Arash Hadipanah, Newton, MA (US); Brian Sachetta, Boston, MA (US); Robert Scott Kobetis, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

(21) Appl. No.: 17/958,615

(22) Filed: Oct. 3, 2022

(65) Prior Publication Data

US 2024/0112510 A1    Apr. 4, 2024

(51) Int. Cl.
*G07C 5/08* (2006.01)
*G07C 5/00* (2006.01)
*H04W 4/48* (2018.01)

(52) U.S. Cl.
CPC .......... *G07C 5/0825* (2013.01); *G07C 5/008* (2013.01); *G07C 5/0808* (2013.01); *H04W 4/48* (2018.02)

(58) Field of Classification Search
CPC .... G07C 5/008; G07C 5/0808; G07C 5/0816; G07C 5/0825; H04W 4/48;
(Continued)

(56) References Cited

U.S. PATENT DOCUMENTS 4,845,630 A * 7/1989 Stephens ................. G01F 9/023
701/123
5,913,917 A * 6/1999 Murphy ............. B60R 16/0232
701/123
(Continued)

FOREIGN PATENT DOCUMENTS

JP    2012036872 A  *  2/2012
JP    2012047694 A  *  3/2012
(Continued)

OTHER PUBLICATIONS

European Search Report in European Appln. No. 23175942.4, mailed on Oct. 12, 2023, 11 pages.
(Continued)

*Primary Examiner* — John M Zaleskas
(74) *Attorney, Agent, or Firm* — Kilpatrick Townsend & Stockton LLP (57) ABSTRACT

Aspects of the embodiments include receiving, from one or more telematics sensors in a vehicle and by the one or more data processing systems, a plurality of telematics data items that are sampled at a plurality of sample times. For a given sample time, accessing a given telematics data item that satisfies the one or more conditions, computing a fuel consumption amount at the given sample time, and determining a distance traveled by the vehicle from a previous sample time that is prior to the given sample time, to the given sample time. For each telematics data items that satisfies the conditions, computing a total distance and a total fuel consumption amount, with the computing based on distances traveled and fuel consumption amounts for the plurality of telematics data items; and determining a fuel efficiency score the total fuel consumption amount and the total distance or a total time.

18 Claims, 6 Drawing Sheets

(58) Field of Classification Search
CPC ........... B60R 16/0236; G01C 21/3469; B60W 2050/0031; B60W 2050/146; B60W 2520/10; B60W 2520/105; B60W 2530/18; B60W 40/09; B60W 50/14
USPC ........................................................ 701/123
See application file for complete search history.

(56) References Cited

U.S. PATENT DOCUMENTS

| | | | | |
|---|---|---|---|---|
| 6,453,731 | B1* | 9/2002 | Yaegashi | G01F 9/008 73/114.52 |
| 7,219,539 | B1* | 5/2007 | Bauerle | B60R 16/0236 73/114.54 |
| 10,040,459 | B1* | 8/2018 | Kukreja | G07C 5/008 |
| 11,134,360 | B2 | 9/2021 | Cordova et al. | |
| 2002/0032540 | A1* | 3/2002 | Sadahiro | G01F 23/0007 702/50 |
| 2002/0098851 | A1* | 7/2002 | Walczak | G01S 19/396 342/357.31 |
| 2006/0089785 | A1* | 4/2006 | Sato | G01F 9/023 701/123 |
| 2007/0233364 | A1* | 10/2007 | Kumar | B61L 15/0058 701/123 |
| 2008/0223453 | A1* | 9/2008 | Carr | F02D 19/088 137/386 |
| 2010/0010732 | A1* | 1/2010 | Hartman | G01C 21/3469 701/532 |
| 2010/0049397 | A1* | 2/2010 | Liu | G01C 21/3469 701/31.4 |
| 2011/0137470 | A1* | 6/2011 | Surnilla | G01C 21/26 700/282 |
| 2011/0166740 | A1* | 7/2011 | Desborough | B60W 10/08 701/31.4 |
| 2011/0257869 | A1* | 10/2011 | Kumar | F02D 41/1406 701/103 |
| 2011/0270486 | A1* | 11/2011 | Stevens | G07C 5/008 701/31.4 |
| 2013/0046458 | A1* | 2/2013 | Dufournier | G07C 5/085 701/123 |
| 2013/0054118 | A1* | 2/2013 | Nagumo | F02D 41/3005 701/104 |
| 2013/0218446 | A1* | 8/2013 | Bradley | G06Q 10/00 701/123 |
| 2014/0005917 | A1* | 1/2014 | Leggett | G06Q 10/00 701/123 |
| 2014/0149145 | A1* | 5/2014 | Peng | G06F 3/0346 702/150 |
| 2014/0214311 | A1* | 7/2014 | Stevens | F02D 19/026 701/123 |
| 2014/0277971 | A1* | 9/2014 | Oshiro | G07C 5/00 701/99 |
| 2014/0278206 | A1* | 9/2014 | Girod | G01P 15/0891 702/141 |
| 2015/0134226 | A1* | 5/2015 | Palmer | B60W 40/10 701/101 |
| 2015/0266482 | A1* | 9/2015 | Quix | B60W 40/00 701/123 |
| 2015/0316390 | A1* | 11/2015 | Kameyama | G08G 1/096741 701/537 |
| 2016/0059872 | A1* | 3/2016 | Kumar | F02D 41/0025 701/19 |
| 2016/0098729 | A1* | 4/2016 | Bradley | G06Q 30/018 701/123 |
| 2016/0252381 | A1* | 9/2016 | Kwak | G07C 5/0825 701/123 |
| 2017/0066328 | A1* | 3/2017 | Yoon | B60W 10/18 |
| 2017/0151917 | A1* | 6/2017 | Bradley | G01F 9/001 |
| 2017/0270790 | A1* | 9/2017 | Neiger | G08G 1/127 |
| 2017/0303095 | A1* | 10/2017 | Cordova | H04W 4/026 |
| 2018/0052025 | A1* | 2/2018 | Gao | G01M 15/05 |
| 2018/0068497 | A1* | 3/2018 | Kurtz | G07C 5/0808 |
| 2018/0225893 | A1* | 8/2018 | Brenner | G07C 5/0825 |
| 2018/0286145 | A1* | 10/2018 | Lindelöf | B60K 28/02 |
| 2018/0297604 | A1* | 10/2018 | Lindelöf | B60W 40/09 |
| 2018/0345885 | A1* | 12/2018 | Seger | B60W 50/14 |
| 2018/0345983 | A1* | 12/2018 | Lindelöf | G07C 5/0841 |
| 2018/0345984 | A1* | 12/2018 | Lindelöf | G07C 5/008 |
| 2018/0345985 | A1* | 12/2018 | Lindelöf | B60W 40/09 |
| 2018/0354524 | A1* | 12/2018 | Lindelöf | G06Q 10/06398 |
| 2018/0354525 | A1* | 12/2018 | Lindelöf | G06Q 10/0639 |
| 2019/0066535 | A1* | 2/2019 | Pifko | G09B 19/167 |
| 2019/0145789 | A1* | 5/2019 | Li | G01C 21/3469 701/123 |
| 2020/0114845 | A1* | 4/2020 | Seger | G07C 5/0825 |
| 2022/0046387 | A1* | 2/2022 | Cordova | H04M 1/725 |
| 2022/0154662 | A1* | 5/2022 | Garbe | F02D 41/0025 |
| 2022/0187087 | A1* | 6/2022 | Leung | G07C 5/0808 |
| 2022/0341742 | A1* | 10/2022 | Marcovitch | G08G 1/005 |
| 2023/0153735 | A1* | 5/2023 | Dhara | G06N 20/00 705/7.39 |
| 2023/0392940 | A1* | 12/2023 | Inoue | G07C 5/08 |

FOREIGN PATENT DOCUMENTS

| | | | |
|---|---|---|---|
| JP | 2015175288 A | * | 10/2015 |
| WO | WO 2016/184497 | | 11/2016 |
| WO | WO-2016184497 A1 | * | 11/2016 |

OTHER PUBLICATIONS

Akcelik, "Efficiency and drag in the power-based model of fuel consumption," Transportation Research Part B: Methodological, Oct. 1, 1989, 23(5):376-85.

Barth et al., "Modal emissions modeling: A physical approach," Transportation Research Record, Jan. 1996, 1520(1):81-8.

Deaton, "How Instant MPG Readout Works" Apr. 30, 2009, retrieved Jan. 25, 2023 from URL <https://auto.howstuffworks.com/fuel-efficiency/hybrid-technology/instant-mpg-readout.htm>, 11 pages.

epa.gov, "Fast Facts on Transportation Greenhouse Gas Emissions". United States Environmental Protection Agency, dated Dec. 2021, retrieved Jan. 25, 2023 from URL <EPA-420-F-21-076. https://www.epa.gov/greenvehicles/fast-facts-transportation-greenhouse-gas-emissions>, 6 pages.

epa.gov, "Greenhouse Gas Emissions from a Typical Passenger Vehicle" United States Environmental Protection Agency, dated Mar. 2018, retrieved Jan. 25, 2023 from URL<https://www.epa.gov/greenvehicles/greenhouse-gas-emissions-typical-passenger-vehicle?>, 9 pages.

Lardinois, "Google Maps launches eco-friendly routing in the US", dated Oct. 6, 2021, retrieved Jan. 25, 2023 from URL <https://techcrunch.com/2021/10/06/google-maps-launches-eco-friendly-routing-in-the-u-s/>, 9 pages.

Lenaers, "Real Life CO2 Emission and Consumption of Four Car Powertrain Technologies Related to Driving Behaviour and Road Type," 9th International Conference on Engines and Vehicles, Sep. 13, 2009, 2 pages.

MacMillan et al., "Global Warming 101: Everything you wanted to know about our changing climate but were too afraid to ask," National Resources Defense Council (NRDC), dated Apr. 7, 2021, retrieved Jan. 25, 2023 from URL<https://www.nrdc.org/stories/global-warming-101>, 14 pages.

NOAA National Centers for Environmental Information, "State of the Climate: Monthly Global Climate Report for Annual 2020," dated Jan. 2021, retrieved Jan. 25, 2023, from URL <https://www.ncei.noaa.gov/access/monitoring/monthly-report/global/202013>, 12 pages.

Rakha et al., "Virginia tech comprehensive power-based fuel consumption model: model development and testing," Transportation Research Part D: Transport and Environment, Oct. 1, 2011, 16(7):492, 20 pages.

Skog et al., "Indirect instantaneous car-fuel consumption measurements," IEEE Transactions on Instrumentation and Measurement, Apr. 21, 2014, 63(12):3190-8.

* cited by examiner

500 input: sensor readings $x_t \in R^3$, vehicular parameters set per_trip_distance_traveled = 0, per_trip_fuel_consumed = 0
initialize incremental_distance_traveled $d_t \in R^1$ for t=2 to T do:
    $d_t$ = Compute incremental distance traveled since t-1
    Determine whether $x_t$ is valid
    if $x_t$ is valid then
        per_trip_distance_traveled += $d_t$
        per_trip_fuel_consumed += Compute fuel consumed($x_t$, vehicular parameters)
    endif
end for
output per_trip_distance_traveled, per_trip_fuel_consumed

METHOD AND SYSTEM FOR OBTAINING VEHICLE FUEL EFFICIENCY

BACKGROUND

Fuel efficiency is an important characteristic of personal and commercial vehicles. The cost of fuel directly affects the financial wellbeing of many businesses and individuals. In addition, vehicles contribute to a significant portion of world's greenhouse emission and air pollution.

Some vehicles have features of displaying instant fuel efficiency to a driver. These vehicles are equipped with internal sensors that measure, e.g., the engine speed (i.e., how hard the engine is working), the fuel-flow rate, the manifold pressure, and the throttle position. These measurement results are fed into the vehicle's computer, which compiles the data into an instant fuel efficiency number that informs the driver how much fuel is being consumed at a given moment.

SUMMARY

In one aspect, a method implemented by one or more data processing systems is provided. The method includes receiving, from one or more telematics sensors in a vehicle and by the one or more data processing systems, a plurality of telematics data items that are sampled at a plurality of sample times. For a given sample time, the method includes: accessing a given telematics data item that satisfies one or more conditions; computing, by the one or more data processing systems, a fuel consumption amount at the given sample time; and determining, by the one or more data processing systems, a distance traveled by the vehicle from (i) a previous sample time that is prior to the given sample time, to (ii) the given sample time. The method includes, for a plurality of telematics data items that represent valid data, computing, by the one or more data processing systems, a total distance and a total fuel consumption amount, with the computing based on distances traveled and fuel consumption amounts for the plurality of telematics data items. The method includes determining, by the one or more data processing systems, a fuel efficiency score based on the total fuel consumption amount and at least one of: the total distance; or a total time for the vehicle to travel the total distance. The method includes providing the fuel efficiency score to the driver on a display or through audio output.

In some implementations, the one or more data processing systems comprise a mobile device application. The method includes presenting, using the mobile device application, at least one of: the fuel efficiency score; or an advisory message about fuel efficiency.

In some implementations, the method includes determining, by the one or more data processing systems, that the given telematics data item satisfies the one or more conditions. The determining specifically includes: parsing the given telematics data item to identify a structure of the given telematics data item, with the structure specifying one or more fields of the given telematics data item; identifying contents of the one or more fields in the given telematics data item; and based on the identified contents, determining that the one or more conditions are satisfied.

In some implementations, the method includes comparing the fuel efficiency score with a model fuel efficiency score.

In some implementations, the one or more telematics sensors comprise a navigation signal receiver that measures the distance traveled by the vehicle.

In some implementations, the fuel consumption amount is computed based on a model that receives a vehicle-specific parameter and the plurality of telematics data items.

In some implementations, each telematics data item comprises: a vertical velocity of the vehicle; a forward velocity of the vehicle; and a forward acceleration of the vehicle.

In some implementations, the one or more telematics sensors comprise an accelerometer. The method further comprises: determining an orientation of the accelerometer relative to the vehicle; and determining the forward acceleration based on the orientation of the accelerometer and an output of the accelerometer.

In some implementations, the one or more conditions comprise at least one of: the identified contents are not empty; the identified contents comprise a valid measurement value; or the identified contents comprise a valid time value.

In some implementations, the fuel efficiency score comprises at least one of: the total fuel consumption amount; a cost for the total fuel consumption amount; an amount of carbon dioxide emission; a ratio between the total time and the total fuel consumption amount; a ratio between the total time and the cost for the total fuel consumption amount; a ratio between the total time and the amount of carbon dioxide emission from the total fuel consumption amount; a ratio between the total distance and the total fuel consumption amount; a ratio between the total distance and the cost for the total fuel consumption amount; or a ratio between the total distance and the amount of carbon dioxide emission from the total fuel consumption amount.

In some implementations, the method includes adjusting the model based on actual fuel consumption data.

In some implementations, the method includes storing the one or more telematics data items in a hardware storage device prior to the accessing.

In some implementations, the one or more telematics data items are received in a stream, and wherein the given telematics data item is accessed real-time at reception of the given telematics data item.

In some implementations, the presenting of the fuel efficiency score or the advisory message occurs at the given sample time.

In some implementations, the advisory message comprises at least one of: fuel efficiency information; a trend of fuel consumption over time; or a recommendation of adjustment of driving behavior.

In one aspect, a data processing system for obtaining fuel efficiency information of a vehicle includes a receiver and a processor. The receiver receives, from one or more telematics sensors, a plurality of telematics data items that are sampled at a plurality of sample times. The processor accesses, for a given sample time, valid telematics data. The processor computes a fuel consumption amount at the given sample time. The processor determines a distance traveled by the vehicle from (i) a previous sample time that is prior to the given sample time, to (ii) the given sample time. For all telematics data items that are valid, the processor computes a total distance and a total fuel consumption amount. The processor obtains a fuel efficiency score based on the total fuel consumption amount and at least one of: the total distance; or a total time for the vehicle to travel the total distance.

In some implementations, the processor determines that the given telematics data item satisfies the one or more conditions by: parsing the given telematics data item to identify a structure of the given telematics data item, with the structure specifying one or more fields of the given telematics data item; identifying contents of the one or more fields in the given telematics data item; and determining, based on the identified contents, that the one or more conditions are satisfied.

In some implementations, the processor compares the fuel efficiency score with a model fuel efficiency score.

In some implementations, the system includes the one or more telematics sensors that are electrically independent to the vehicle.

In one aspect, one or more non-transitory computer-readable storage media store instructions, that when executed, cause a hardware processor to perform operations. The operations include receiving, from one or more telematics sensors in a vehicle and by the one or more data processing systems, a plurality of telematics data items that are sampled at a plurality of sample times. The operations include storing, to a hardware storage device, the one or more telematics data items. For a given sample time, the operations include: accessing, from the hardware storage device, a given telematics data item that satisfies one or more conditions; computing, by the one or more data processing systems, a fuel consumption amount at the given sample time; and determining, by the one or more data processing systems, a distance traveled by the vehicle from (i) a previous sample time that is prior to the given sample time, to (ii) the given sample time. The operations include, for a plurality of telematics data items that satisfy the one or more conditions, computing, by the one or more data processing systems, a total distance and a total fuel consumption amount, with the computing based on distances traveled and fuel consumption amounts for the plurality of telematics data items. The operations include determining, by the one or more data processing systems, a fuel efficiency score based on the total fuel consumption amount and at least one of: the total distance; or a total time for the vehicle to travel the total distance.

BRIEF DESCRIPTION OF THE DRAWINGS

FIG. 7 is a block diagram of an example computer system 700 in accordance with embodiments In the figures, like numerals indicate like components. Unless expressly stated, broken lines do not suggest that any components in the figures are optional or not part of the illustrated embodiments. Instead, the broken lines may be used to indicate functional or structural relationships between illustrated components, as would be readily understood by one of ordinary skill in the art.

DETAILED DESCRIPTION

While fuel efficiency receives significant attention from vehicle operators and other members of the public, existing techniques to determine fuel consumption do not always provide adequate information to gauge actual fuel consumption or relate driving behavior to fuel consumption. For example, not all vehicles are equipped with sensors internal to the engine for measuring engine performance; those vehicles without built-in sensors cannot communicate fuel efficiency information. Second, for vehicles supporting instant fuel efficiency display, the information is generally displayed only to the driver in the moment and is not stored or communicated to external devices. Third, the fuel efficiency information displayed to the driver has limited meaningfulness. Even if the driver can tell that the fuel efficiency is, e.g., 25 miles per gallon at a moment or throughout a duration, the driver does not know the impact of their driving behavior to the fuel efficiency. Thus, despite seeing the displayed fuel efficiency information, the driver may still lack the motivation and the guidance for altering their behavior to improve fuel efficiency.

As described in detail below, embodiments of the disclosure include a method and a system that obtain fuel efficiency information of a vehicle based on telematics data. The telematics data may be transmitted to a remote data processing system, such as a server, or may be transmitted to a mobile device equipped with a mobile processor, to obtain fuel consumption information and to obtain an eco-score for the trip and/or the driver. Moreover, the data processing system can correlate the driver's behavior with the fuel consumption, compare the real fuel efficiency with a model fuel efficiency, and potentially give suggestions with respect to potential fuel efficiency improvement. The telematics data can be processed in a streaming manner to provide real-time or near-real-time information to the driver. Or the telematics data can be processed in larger batches, such as after the trip is completed, during regular intervals, at each stop, at each fuel stop, etc. The telematics data can then be processed and an eco-score output and shared with others, including the driver. The eco-score can also be sent with information about how the eco-score was calculated, what it means, and how the driver can improve it.

The telematics data can be processed to derive an eco-score by one or a combination of a processor in the vehicle, by a mobile device, by a remote server, or by cloud-based systems. For example, sensors within the vehicle (including on-board sensors and/or sensor tags) can communication telematics data to one or a combination of the processor in the vehicle, the mobile device, the remote server, or the cloud. Sensors within the vehicle can transmit telematics data directly to the aforementioned processors by a direct, wireless link, such as a cellular or Wi-Fi link; or indirectly, by a wireless communication system in the vehicle, such as those found in connected cars. Other ways of communicating telematics data and processing the telematics data to derive an eco-score are within the scope of this disclosure.

In addition, the eco-scores derived by one or a combination of a processor in the vehicle, by a mobile device, by a remote server, or by cloud-based systems can be communicated to the user by wired or wireless links. For example, a connected car can process telematics data internally and use a display or audio outputs to provide the eco-score and any other feedback for the user. The eco-score can be sent to a mobile app or personal computer or via SMS or other ways.

It is noted that the term "fuel" in this disclosure includes not only traditional fossil fuel such as gasoline and diesel, but also clean energy resources that are used to power a vehicle. For example, embodiments of this disclosure can apply to electricity-powered vehicles, in which case "fuel" means electric power stored in, e.g., batteries of an electric vehicle. While the data processing system or the mobile device may be configured to apply different fuel consumption models for different fuel types, the concepts of obtaining fuel consumption information and correlating the fuel consumption information with driver's behavior are consistent for different fuel types.

Figure 1:
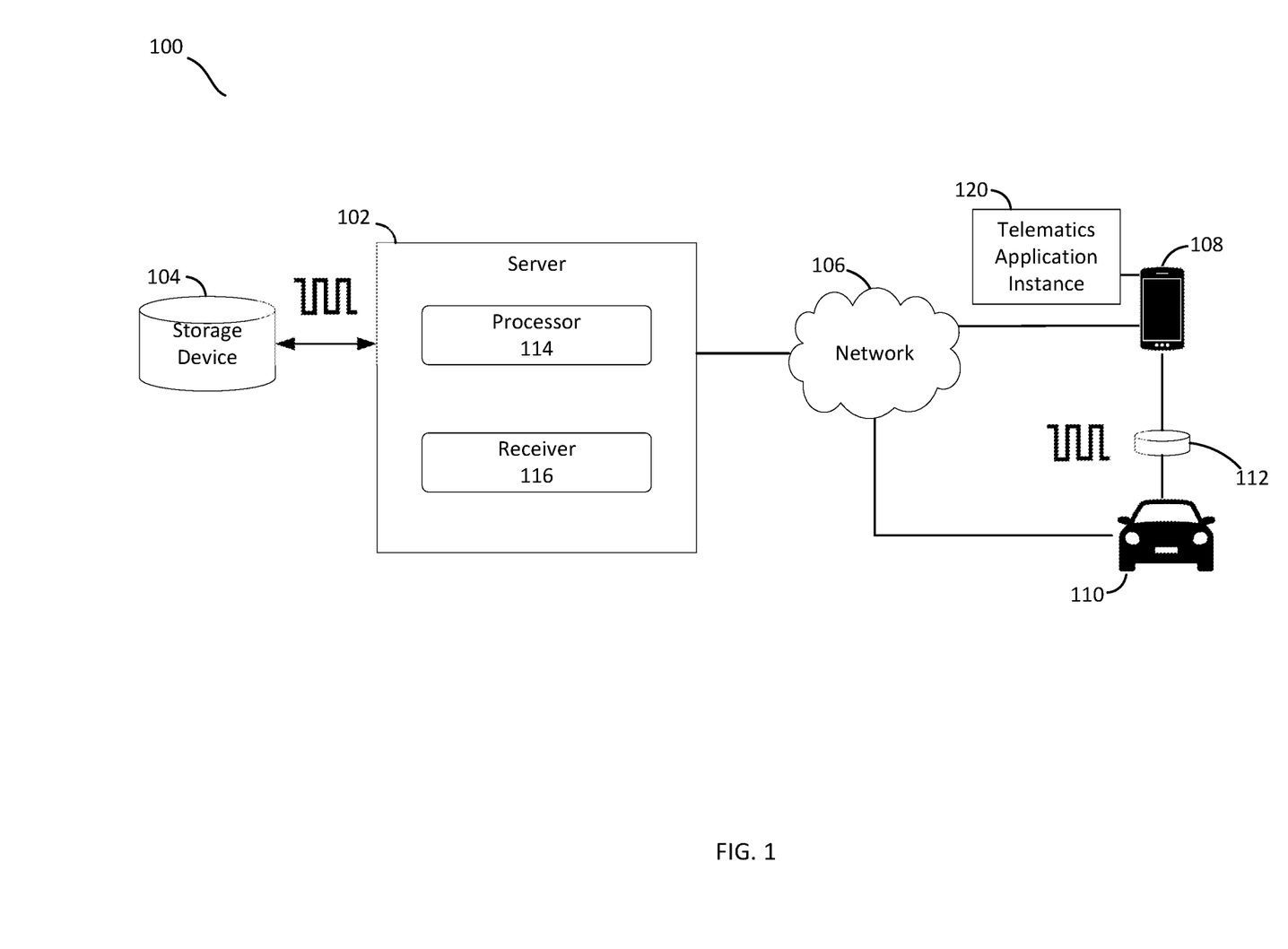
FIG. 1 is a schematic diagram illustrating an example system for obtaining vehicle fuel efficiency, according to one or more embodiments.

FIG. 1 is a schematic diagram illustrating an example system 100 for obtaining fuel efficiency information of a vehicle 110, according to one or more embodiments. The system 100 includes a server 102, a storage device 104, a network 106, a mobile device 108, and one or more telematics sensors 112. In the system 100, the one or more telematics sensors 112 operate along with the mobile device 108 periodically to collect telematics data from the vehicle 110 and transmit the telematics data to the server 102 via the network 106. The server 102 then processes the received telematics data to compute fuel efficiency of the vehicle 110. These elements and operations are described in detail below.

The one or more telematics sensors 112 can be formed as a single element such as a box, or a tag, or can be formed as multiple elements physically separate from each other. In some embodiments, the one or more telematics sensors 112 are attached to the vehicle 110 and travel with the vehicle 110. Example attaching means include slots, hooks, suction cups, magnets, glue, bolts and nuts, and plugs. The one or more telematics sensors 112 can be attached to the interior or the exterior of the vehicle 110. In embodiments where the one or more telematics sensors 112 have separate physical elements, the one or more telematics sensors 112 can be attached to multiple locations of the vehicle 110.

The mobile device 108 receives the telematics data collected by the one or more telematics sensors 112. In some embodiments, the communication between the mobile device 108 and the one or more telematics sensors 112 can use wireless technologies such as Bluetooth, ZigBee, wireless local area network (WLAN), cellular network, or other technologies for Internet-of-Things (IoT) connections. In some embodiments, the mobile device 108 can be a mobile phone running a telematics application 120 that manages the communication with the one or more telematics sensors 112.

The telematics data are then transmitted from the mobile device 108 to the server 102 via the network 106, which can be a wireless network under Long-Term Evolution (LTE), New Radio (NR), or other cellular technologies. In some embodiments where the vehicle 110 is within the coverage of the network 106, the telematics data can be directly transmitted from the one or more telematics sensors 112 to the server 102. The server 102 can be situated adjacent to or remote from the vehicle 110. As the one or more telematics sensors 112 periodically obtain the telematics data, the mobile device 108 and/or the one or more telematics sensors 112 also periodically transmit the obtained telematics data.

The server 102 has a transceiver 116 to receive the telematics data and a processor 114 to process the telematics data. In some embodiments, the received telematics data are stored in the storage device 104, which can be integrated within the server 102 or separate from the server 102. The processor 114 accesses the telematics data from the storage device 104 and processes the telematics data per each sample time. That is, for each telematics data item obtained ("sampled") by the one or more telematics sensors 112 at a given sample time, the processor 114 processes the telematics data item corresponding to the given sample time. Alternatively or additionally, the telematics data items are streamed to the server 102 (or other computing device, such as the mobile device) in real-time. The processor can access the telematics data items in real-time at the reception of each telematics data item. When the processor determines that it has sufficient information, the processor can output an eco-score to the driver, so the driver gets real-time or near real-time updates on the eco-score, as well as tips on how to improve the eco-score. For example, the processor can use a sliding window to continuously process received telematics data observed during the duration defined by the time window. In addition, the transceiver 116 can transmit information back to the mobile device 108. Such information can include, e.g., calculated fuel efficiency score and advisory messages about fuel efficiency, which are described later in detail.

Figure 2:
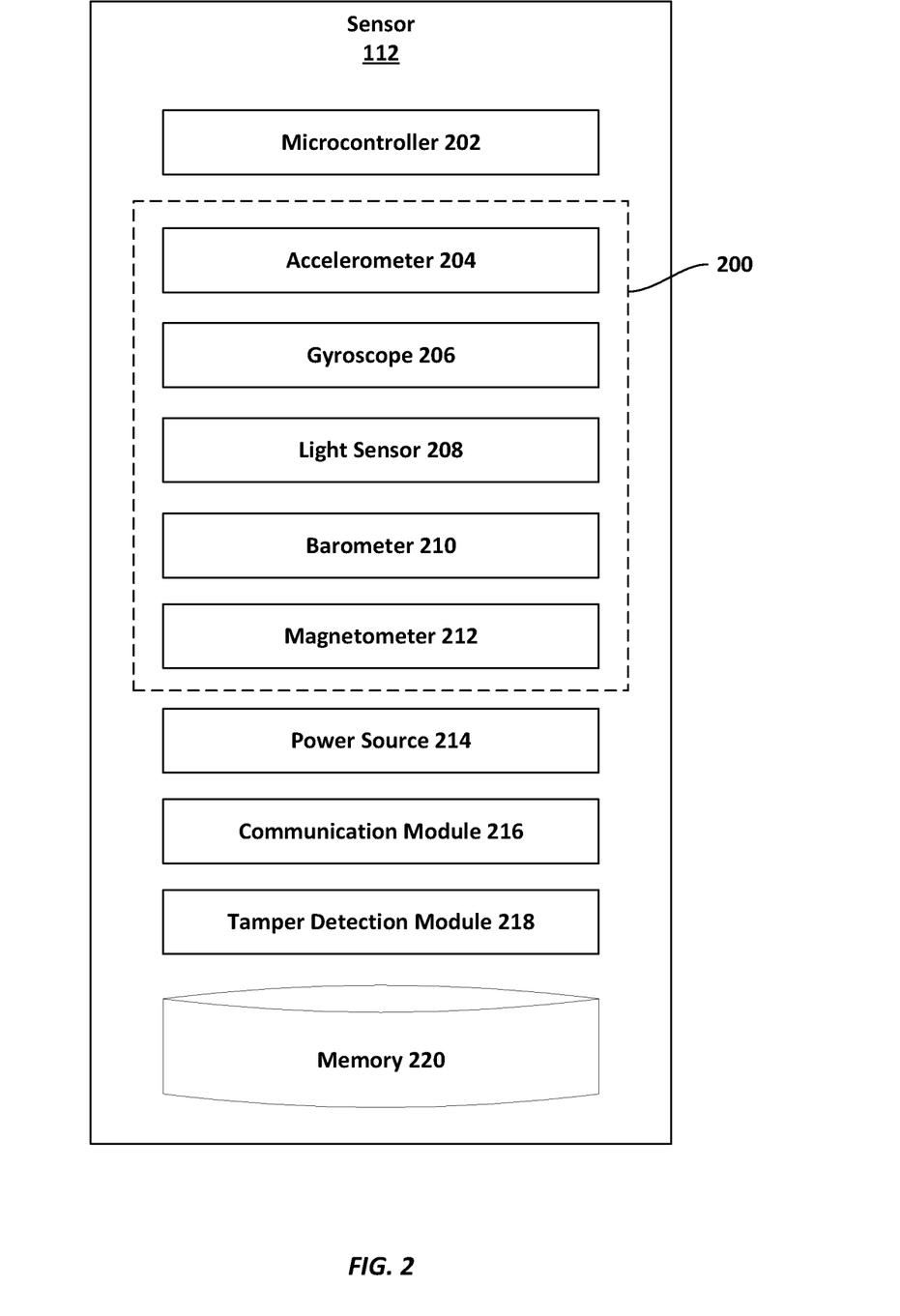
FIG. 2 is a schematic diagram of an example sensor, according to one or more embodiments.

FIG. 2 is a schematic diagram of an example sensor according to one or more embodiments. The sensor shown in FIG. 2 can be substantially the same as the one or more telematics sensors 112 in the system 100 in FIG. 1. Some or all of the components of the one or more telematics sensors 112 can be implemented on hardware as electrical circuits and can be standalone or combined with circuits of other components.

As shown in FIG. 2, in some embodiments, the one or more telematics sensors 112 have a microcontroller 202. The microcontroller 202 can be a processor capable of executing programmed instructions (e.g., software or firmware), which controls the operation of the various other components of the one or more telematics sensors 112. The microcontroller 202 can be configured to operate independently to the control system of the vehicle 110.

In some embodiments, the one or more telematics sensors 112 have a sensor suite 200 that detects physical information of various forms and converts the physical information into electrical signals. The sensor suite 200 can have one or more of: (i) an accelerometer 204, which can be a three-axis accelerometer that measures the acceleration of the one or more telematics sensors 112 and thereby of the vehicle 110; (ii) a gyroscope 206, which can be a three-axis gyroscope that measures the orientation and/or angular velocity of the one or more telematics sensors 112; (iii) a light sensor 208; (iv) a barometer 210; and (v) a magnetometer 212. As discussed above, the components of the sensor suite 200 can be physically integrated within, e.g., a tag or a box, or can be distributed apart from each other at different physical locations.

In some embodiments, the one or more telematics sensors 112 have a memory 220 and a communications module 216. The memory 220 stores the data obtained by the sensor suite 200, and the communications module 216 communicates the stored data with the mobile device 108 and/or the server 102. The storage and transmission of the data are controlled by the microcontroller 202.

In some embodiments, the vehicle 110 can be a connected vehicle. Thus, vehicle 110 can include a plurality of built-in or on-board sensors that can collect information during a trip. The built-in or on-board sensors can be similar to those identified in FIGS. 2 and 3. The vehicle 110 can also include a processor, memory, and a communications system. The processor of the vehicle can process information collected by the sensors during a trip. The resulting telematics data can be used for various purposes, including correlating fuel consumption with aspects of the trip, such as driver behavior, acceleration, environmental factors, distances, elevation changes, number of stops, route taken, etc. The vehicle 110 can use communications system to communicate sensor information with external devices, such as a mobile device or devices connected through the Internet or other network. These external devices can perform the telematics analysis on the sensor data. The vehicle 110 can also communicate the results of telematics data analysis. For example, the vehicle 110 can communicate to the driver (e.g., in (near) real-time, at the end of the trip, at stops, periodically, or upon request) about fuel consumption and suggestions that the driver can consider to improve fuel efficiency.

In some embodiments, the one or more telematics sensors 112 has a tamper detection module 218. The tamper detection module 218 aids in verification that sensor data from a trip are correlated to the vehicle 110 and thereby reduces error or fraud in fuel efficiency calculation. The tamper detection module 218 can be based on various methods. As an example, the tamper detection module 218 uses the accelerometer 204 with an orientation algorithm. Specifically, the one or more telematics sensors 112, once secured to the vehicle 110, have knowledge of their correction angle in relation to the vehicle travelling direction. The tamper detection module 218 computes the rotation matrix that converts from the axes of the accelerometer 204 to the axes corresponding to the vehicle 110's frame of reference. Should the one or more telematics sensors 112 experience any sudden changes in orientation, the reason can be a change of location from their original locations. This can be considered a tampering event and can be reported to the server 102.

In some embodiments, the one or more telematics sensors 112 have a power source 214 that provides electric power to the various components. For example, the power source 214 can be a battery that provides power without being connected to the vehicle 110's electrical system. As such, the one or more telematics sensors 112 can operate independently to the electrical system of the vehicle 110. In some other examples, the power source 214 can be configured to both support using the vehicle 110's power and both using the battery's power.

Figure 3:
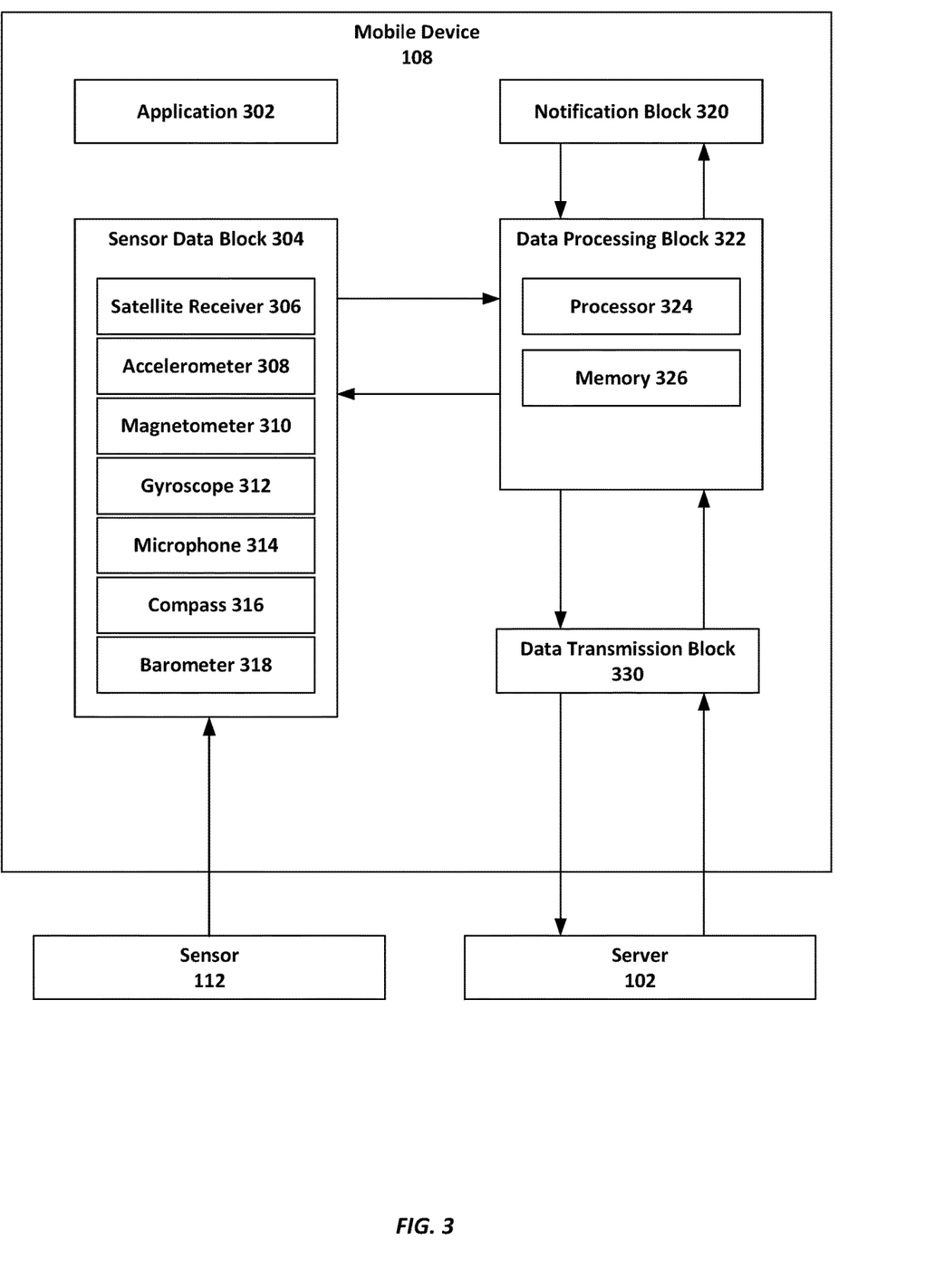
FIG. 3 is a schematic diagram of an example mobile device, according to one or more embodiments.

FIG. 3 is a schematic diagram of an example mobile device in communication with a sensor and a server, according to one or more embodiments. The mobile device, the sensor, and the server shown in FIG. 3 can be substantially the same as the mobile device 108, the one or more telematics sensors 112, and the server 102 in the system 100 in FIG. 1. Some or all of the components of the mobile device 108 can be implemented on hardware as electrical circuits and can be standalone or combined with circuits of other components.

As shown in FIG. 3, in some embodiments, the mobile device 108 has a sensor data block 304 that has one or more of: (i) a satellite receiver 306 that receives satellite signals such as Global Positioning System (GPS) signals; (ii) an accelerometer 308; (iii) a magnetometer 310; (iv) a gyroscope 312; (v) a microphone 314; (vi) a compass 316; and (vii) a barometer 318. The sensor data block 304 is in communication with the one or more telematics sensors 112 to receive data obtained by the one or more telematics sensors 112. Some or all of the components of the data block 304 can collect telematics data similarly to the one or more telematics sensors 112. Therefore, the components of the data block 304 can also be used as telematics sensors to supplement the one or more telematics sensors 112 in some embodiments.

A comparison between components (i)-(v) of the sensor suite 200 in FIG. 2 and components (i)-(vii) of the sensor data block 304 shows that there can potentially be an overlap between the two. For example, both the sensor suite 200 and the sensor data block 304 can have an accelerometer that measures acceleration information of the vehicle 110. In these scenarios, the mobile device 108 can be configured to determine which source of sensor data to use or to dynamically combine data from multiple sources using signal processing techniques to improve data accuracy.

Further, for components that are not part of the overlap between the sensor suite 200 and the sensor data block 304, a component being shown in one figure does not preclude the sensor component from being implemented by the device illustrated in the other figure. For example, although the satellite receiver 306 is shown only in the sensor data block 304 in FIG. 3 but not in the sensor suite 200 in FIG. 0.2, some embodiments can implement a satellite receiver in the sensor suite 200 of the mobile device 108 as well.

In some embodiments, the mobile device 108 has a data processing block 322, which includes a processor 324 and a memory 326. The mobile device 108 also has a data transmission block 330. The data processing block 322 receives sensor data from the sensor data block 304 and causes the data transmission block 330 to communicate the sensor data with the server 102. In addition, the mobile device 108 has a notification block 320 that notifies the user of the mobile device 108 of the status of sensing, data processing, and data transmission.

The mobile device 108 runs an application 302 to manage the aforementioned operations involving the sensor data block 304, the data processing block 322, the data transmission block 330, the notification block 320, the one or more telematics sensors 112, and the server 102. For example, the application 302 can be configured to: determine the source of sensing data to be processed in situations where the sensor data block 304 and the sensor suite 200 have overlapping components; control the sampling frequency of the one or more telematics sensors 112 and/or the sensor data block 304; determine validity of sensor data; control the timing and content of communication between the data transmission block 330 and the server 102; and/or control the notification block 320 to determine the content of notification. The application 302 can include software code stored in the memory 326 and executable by the processor 324.

Fuel efficiency is determined as an amount of fuel consumed per unit distance traveled or other unit of measure, such as time or trip segment. To compute fuel efficiency of a trip, the amount of fuel consumed for the trip is divided by the unit of measure.

Here, the term "trip" can mean the entire route traveled by the vehicle from its departure point to its destination; but "trip" can also mean segments of the entire route. The term "trip" can refer to a segment of the route traveled by the vehicle after which the fuel efficiency information is updated. For example, a driver may receive updated fuel efficiency information every ten seconds. In this case, the ten-second vehicle movement between every two consecutive updates can be considered a "trip."

The distance of a trip can be obtained using navigation signals such, as GPS or GNSS signals. In embodiments, the distance of a trip can be determined based on a time and distance traveled, odometer information, average speed from speedometer readings for a trip segment duration, or by other ways. In some embodiments, the one or more telematics sensors 112 periodically obtain telematics data samples during a trip. Along with each sampling, the mobile device 108 receives navigation signals to obtain coordinates of the vehicle 110 at a sample time. When the sampling frequency is high (e.g., 10 Hz), the incremental distance traveled between two consecutive sample times can be approximately equated to the linear distance between the coordinates of the vehicle 110 at the two consecutive sample times. Adding up all incremental distances within a trip gives the total distance traveled in the trip.

The total fuel consumption of a trip is obtained using a fine-grained fuel-consumption model. Specifically, the model takes input of the vehicle's movement status at a given sample time and outputs fuel consumption rate, such as a fuel mass flow rate, within the sampling period. The total fuel consumption can thus be obtained by accumulating the incremental fuel consumption amount for all sampling periods within the trip.

Figure 4:
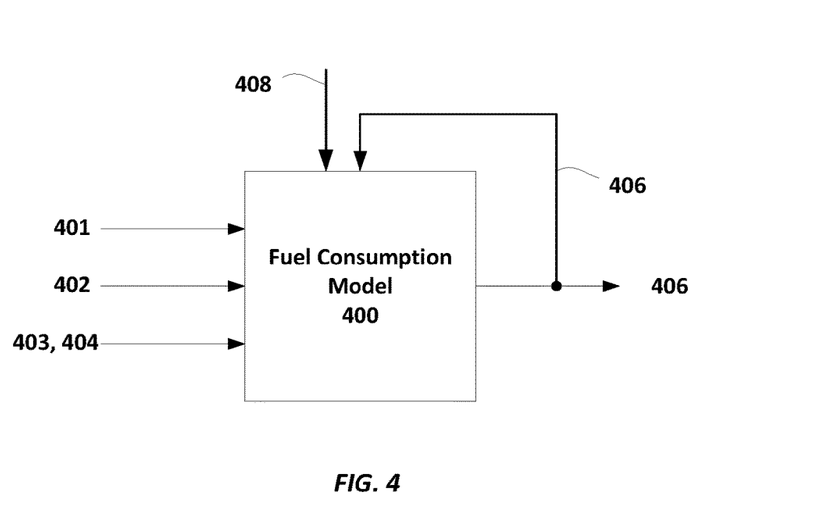
FIG. 4 is a schematic diagram illustrating an example fuel consumption model, according to one or more embodiments.

FIG. 4 is a schematic diagram illustrating an example fuel consumption model 400 according to one or more embodiments. The fuel consumption model 400 can be, e.g., Skog & Handel Instantaneous Fuel Consumption Model, which takes three groups of input: (i) vehicle-specific parameters 401, such as the shape and the weight of the vehicle 110; (ii) vertical velocity 402, which is caused by the non-flat terrain along the route and affected by the driving behavior; and (iii) forward velocity 403 and acceleration 404, which is determined by the driving behavior from telematics data obtained by one or more sensors. The fuel consumption model 400 uses the inputs to output a fuel consumption score 406 for a trip or for a time interval. The fuel consumption model 400 can tune inputs and weights and other parameters to achieve desired results using a comparison between the determined fuel consumption score 406 and real-world fuel consumption values 408. For example, theoretical fuel efficiency information obtained from vehicle-specific information or from vehicle manufacturers can be refined using real-world assessments of fuel efficiency for that vehicle or class of vehicle. The granularity of the inputs can be such that the model accounts for driver habits (aggressive versus defensive drivers, window positions, air conditioning usage, etc.), driving locations (altitudes, temperatures, air quality, city versus rural, etc.), and other factors.

The fuel consumption model 400 can be further improved or refined using real-world data by tuning weights that the model 400 uses to derive outputs. For example, a comparator can be used to compare the model's output 406 with actual fuel consumption values. The actual fuel consumption values can be obtained directly from the vehicle, from calculations made by the driver and input into the eco-score engine, or from third parties.

In embodiments, the fuel consumption model 400 can include vehicle-specific parameters 401 as an input. Vehicle-specific parameters 401 can be obtained from various sources. Vehicle-specific parameters can be obtained based on the vehicle 110's make and model, or, based on the vehicle 110's class information (such as mid-sized sedan or full-sized SUV), or based on vehicle identification number, or by other ways. The vehicle-specific parameters can be preconfigured in the fuel consumption model 400. Thus, no measurement is needed to obtain group (i) inputs. However, because groups (ii) and (iii) inputs depend on the driver's behavior, they need to be measured instantaneously using the one or more telematics sensors 112. For synchronicity, the fuel consumption model 400 is configured to output forward acceleration 404 at the same frequency as the sampling frequency of the one or more telematics sensors 112.

In some embodiments, telematics data from a trip can be used as an input to the fuel consumption model 400, including (vertical and horizontal) velocity, acceleration, navigation data, trip duration, odometer readings, etc. For example, the vehicle 110's vertical velocity 402 can be obtained using a barometer, such as the barometer 210 of the one or more telematics sensors 112 in FIG. 2 or the barometer 318 of the mobile device 108 in FIG. 3. The reading of a barometer indicates the altitude of a location. Thus, the vertical velocity can be determined based on the altitude change between two consecutive sample times. Alternatively or additionally, the vehicle 110's vertical velocity can be determined using the GPS signals or other types of navigation signals, which can indicate the altitude of a location.

The forward velocity 403 can be obtained using GPS signals or other types of navigation signals. The determination of forward velocity 403 is similar to the determination of the incremental distance traveled by the vehicle 110 between two consecutive sample times: Dividing the incremental distance by the sampling interval gives the forward velocity 403 between the two consecutive sample times.

The vehicle 110's forward acceleration 404 can be obtained using an accelerometer, such as the accelerometer 204 of the one or more telematics sensors 112 in FIG. 2 or the accelerometer 308 of the mobile device 108 in FIG. 3. In some embodiments, determining the forward acceleration 404 involves determining an orientation of the accelerometer 204 or 308 relative to the vehicle 110. A number of example methods for determining the relative orientation are described in U.S. Pat. No. 11,134,360, filed on Apr. 12, 2017, which is incorporated herein by reference. The vehicle 110's forward acceleration 404 can thus be obtained based on the relative orientation of the accelerometer 204 or 308 and the output of the accelerometer 204 or 308.

In some embodiments, the fuel consumption model 400 is further adjusted based on real-world fuel consumption data 408 to improve accuracy. The real-world fuel consumption data can be determined based on fuel sensor data, vehicle trip data, or other sensory information obtained from, e.g., on board diagnostic (OBD) tools or flow meter. Real world fuel consumption data can also be obtained from user-supplied fuel consumption information. For example, the telematics data can be correlated with the change in mileage of the vehicle between fuel station visits and the amount of fuel added to the vehicle. Other ways of obtaining real-world fuel consumption information are also contemplated.

The adjustment can utilize, e.g., a machine learning model that is supervised or unsupervised. For example, the machine learning model can use the real-world fuel consumption information as training data sets to improve accuracy of classification or prediction. The adjustment can take place at the mobile device 108, the server 102, or at other devices connected to the network 106.

In some embodiments, the sampled telematics data may contain invalid data items that cannot be properly relied on to compute fuel efficiency. Invalid data can appear at the beginning of a trip when the communication between the one or more telematics sensors 112 and the mobile device 108 has not been stabilized, when the mobile device 108 has not established navigation connection with, e.g., a satellite, when the one or more telematics sensors 112 have not been properly calibrated with their orientation corrected. Invalid data can also appear in the middle of a trip when the one or more telematics sensors 112 drop from their location and lose their orientation. Such data items need to be filtered out in the computation of fuel efficiency.

Data validity can be determined either at the mobile device 108 using the data processing block 322 or at the server 102 using the processor 114. A data item is determined to be valid if it satisfies one or more conditions. The determination can include parsing the data item to identify its structure and identify the contents of one or more fields. Based on the identified contents, data validity is determined if the one or more conditions are satisfied. Many conditions are available for determining data validity. A few of these conditions are described below.

A first example condition is that the identified contents are not empty. Empty contents can happen when, e.g., a sensor fails to activate properly, fails to generate data, or disconnects from the circuitry of the sensor suite/block.

A second example condition is that the identified contents contain a valid measurement value. Invalid measurement values can happen when, e.g., a sensor is not properly calibrated or installed, the measurement values are out of a certain range or inconsistent with measurement values from other sources, or the measurement values explicitly indicate their invalidity.

A third example condition is that the identified contents contain a valid time value. In some scenarios, a sensor can output data before the start of after the end of a trip. To satisfy the third example condition, the identified contents must correspond to measurements that take place within the desired time window.

Figure 5:
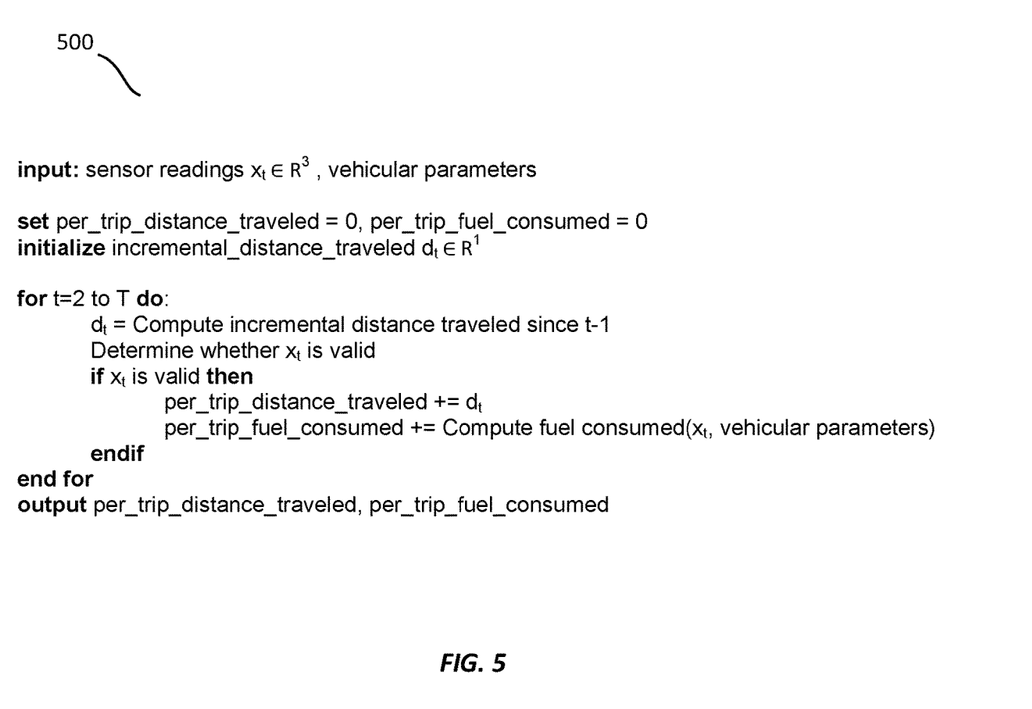
FIG. 5 provides example pseudo code illustrating the computation of a total distance and a total fuel consumption amount of a trip, according to one or more embodiments.

FIG. 5 provides example pseudo code 500 illustrating the computation of a total distance and a total fuel consumption amount of a trip, according to one or more embodiments. The computation illustrated in FIG. 5 can take place at, e.g., the server 102 or the mobile device 108, using the fuel consumption model 400.

Reading the pseudo code 500, one of ordinary skill in the art would understand that the pseudo code 500 takes inputs from sensor readings, such as the readings of one or more telematics sensors 112, and from vehicle-specific parameters. For a given sample time t ranging from 2 to T, the pseudo code 500 determines an incremental distance from the previous sample time t−1. Upon determining that the sensor readings at the given sample time t is valid, the pseudo code 500 adds the incremental distance upon those determined at previous sample times. Also, the pseudo code 500 determines a fuel consumption amount from the previous sample time t−1 to the given sample time t and adds the fuel consumption amount upon those determined at previous sample times. Thus, for a trip ending at time T, the pseudo code 500 outputs a total distance and a total fuel consumption amount. Such computation is consistent with the operations described above with reference to FIGS. 1-4.

With the total distance and a total fuel consumption amount of a trip determined, the server 102 can determine a fuel efficiency score, which can be used to, e.g., evaluate a driver's driving habits and recommend ways to improve fuel efficiency. The fuel efficiency score (or eco-score) can include or be based on, e.g., the total fuel consumption amount, the cost for the total fuel consumption amount, or the amount of greenhouse gas (e.g., carbon dioxide) emission. Alternatively, the fuel efficiency score can be calculated on a per-trip basis or a per-unit-distance basis, or on a per-unit-travel-time basis. Many ways of calculating the fuel efficiency score are available, a few of which are described below as examples. Unless otherwise stated, the per-unit-distance fuel efficiency score in the below examples is calculated by dividing the per-trip fuel consumption by the total trip distance actually traveled.

In some embodiments, the per-trip fuel efficiency score can equal the total fuel consumption amount of the trip actually traveled.

In some embodiments, the per-trip fuel efficiency score can be calculated by multiplying the total fuel consumption amount by the unit cost of fuel.

In some embodiments, the per-trip fuel efficiency score can be calculated by multiplying the total fuel consumption amount by the unit amount of emission from fuel consumption.

In the several examples above, the calculation of fuel efficiency score relies on information (including telematics data) for the specific trip, without comparing the fuel efficiency from another source (such as other drivers, benchmarks, historic values, etc.). The fuel efficiency scores thus obtained can be referred to as "absolute" scores. In some other embodiments, the fuel efficiency score can be compared against fuel efficiency scores from other sources, such as historic values, other drivers, or benchmarks to identify a relative fuel efficiency performance achieved in the trip for the driver. A few examples of calculating such "relative" fuel efficiency scores are described below.

The fuel efficiency score can be compared with a model fuel efficiency score, which can be obtained by changing one or more inputs to the fuel consumption model 400. For example, all other inputs unchanged, one can change the vertical velocity 402 to zero to model a trip that has only flat terrain. The fuel efficiency score thus obtained, referred to as a model fuel efficiency score, can be compared with the fuel efficiency score obtained from the actual trip to show the impact of terrain on fuel efficiency. As another example, all other inputs unchanged, one can change the vehicle-specific parameters 401 to those of another vehicle to model the would-be fuel efficiency of the other vehicle traveling the same trip. The model fuel efficiency score thus obtained can be compared with the fuel efficiency score obtained from the actual vehicle to show the impact of vehicle design on fuel efficiency.

In addition to being compared with a model fuel efficiency score, the fuel efficiency score can be compared with historic fuel efficiency scores to indicate relative fuel efficiency performance. For example, a fuel efficiency score accomplished by a driver traveling a trip can be compared with historic fuel efficiency scores obtained by other drivers traveling the same or a similar trip using the same vehicle model. The result would tell how this driver's behavior affects fuel efficiency compared with other drivers. As another example, in the same trip with multiple trip segments, a fuel efficiency score accomplished by a driver traveling at a constant speed on a terrain can be compared with the fuel efficiency score accomplished by the same driver traveling at varying speeds on the same terrain. The result would tell how speed changes affect fuel efficiency. Accordingly, a model that uses telematics data can correlate the driver's behavior with fuel efficiency, thereby providing the driver with recommendations with respect to fuel-saving driving behavior. Historic fuel efficiency scores can also be statistically analyzed to study the relationships between fuel efficiency performance and, e.g., demographic profile, traffic level, and route selection, etc.

The fuel efficiency score can also be compared with target fuel efficiency advertised by vehicle manufacturers. Different vehicle manufacturers may calculate fuel efficiency differently, potentially resulting in inconsistent information in the market. By contrast, the fuel efficiency score calculated according to one or more embodiments of this disclosure can be manufacturer-independent. Accordingly, the comparison results can inform consumers of the trustworthiness of the vehicle manufacturers and provide consumers an objective and reliable source for evaluating a vehicle's fuel efficiency. In addition, the comparison results, combined with the comparison with the historic fuel efficiency scores, can help the vehicle manufacturers study the change of vehicle's fuel efficiency performance along with the age of the vehicle.

Described above are only a few out of many ways how a fuel efficiency score can be computed and used in practical applications. Depending on the practical application, the fuel efficiency score can be displayed instantaneously by the server 102 or by the mobile device 108, or can be collected and later processed with other fuel efficiency scores. For example, the application 302 of the mobile device 108 can allow the user to choose the format of the fuel efficiency score (e.g., per-trip or per-unit-distance) and see how the fuel efficiency score at a certain moment compares with historic fuel efficiency scores. By analyzing the fuel efficiency score, the application 302 can also give the driver a recommendation on improving fuel efficiency. The recommendation can be included in, e.g., an advisory message about fuel efficiency presented as text or audio by the server 102, the mobile device 108, a screen of the vehicle, or other suitable devices. For example, the advisory message can include text describing the driving behavior or recommending an adjustment of driving behavior, such as "Avoid accelerating harshly," "Your fuel efficiency on this road is higher than 60% of the general population," or "Driving at 60 mph instead of 70 mph on this road can save you $200 a year." The presentation of recommendation can be real-time, e.g., at the time when a telematics data item is accessed, or can be at a later time, e.g., at the end of each trip.

The processor can compare fuel consumption from a sampling window with driving behavior during that sampling window using telematics data to determine how the driving behavior correlates to fuel consumption. The system can the use that correlation to identify and present recommendations to the driver for improving fuel consumption and eco-score. For example, if driving behavior during a sample window results in relatively high fuel consumption as compared to the rest of the trip, the telematics data can be reviewed for that sampling window to determine the driving behavior. If the telematics data indicates driving behavior that had a deleterious effect on fuel consumption, the system can then identify a recommendation or feedback for the driver.

The recommendations for the driver can include changes to driving behavior (e.g., gentle acceleration, speed limits, etc.), changes to travel planning (e.g., changing routes and/or times of day for travel, etc.), recommendations for maintenance of the vehicle (e.g., tire pressure and rotation, air filter changes, etc.), or other recommendations.

In some embodiments, the fuel efficiency score and/or advisory message can be accompanied by a map coded with, e.g., different colors or patterns, to indicate fuel efficiency at different locations of a route. The map can be generated by, e.g., a telematics application on a mobile device, or can be one provided by existing navigation systems in the vehicle or vehicle accessories. Regularly or at the end of a trip, the advisory message can further include statistics information about events or periods in the trip that affect fuel efficiency, such as 5 minutes of cruise that achieved high fuel efficiency or 3 sudden accelerations that negatively affected fuel efficiency. The statistics information can be separately conveyed to the driver or can be displayed along with the map. The advisory message can also indicate a trend of fuel consumption or efficiency over the time of a trip or trip segment.

Figure 6:
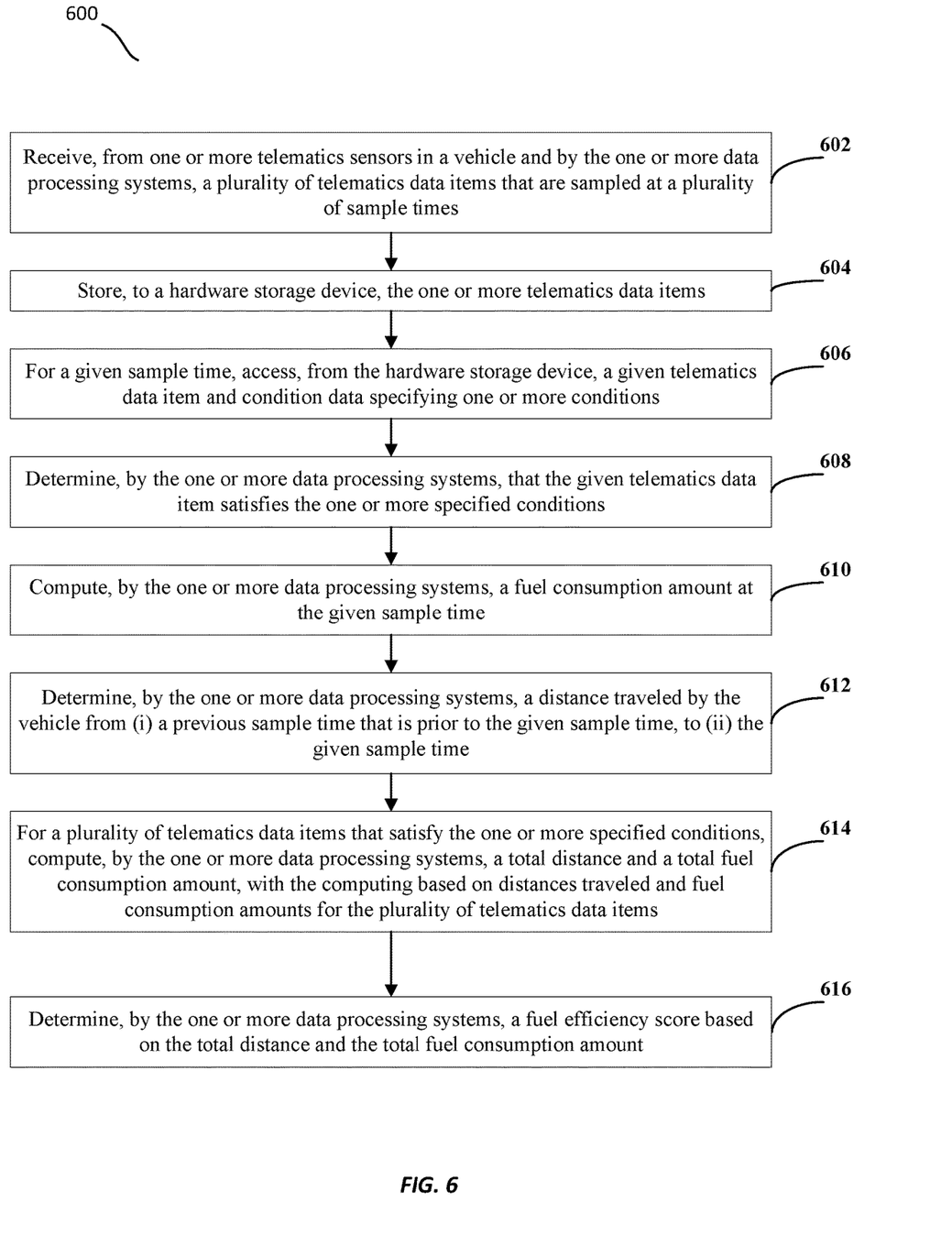
FIG. 6 is a flowchart illustrating an example method for obtaining vehicle fuel efficiency, according to one or more embodiments.

FIG. 6 is a flowchart illustrating an example method 600 for obtaining vehicle fuel efficiency, according to one or more embodiments. The method 600 can be implemented on the server 102 or any other suitable devices. The steps of the method 600 can be substantially the same as the operations of the system 100 described above with reference to FIGS. 1-5.

At step 602, the method 600 involves receiving, from one or more telematics sensors in a vehicle and by the one or more data processing systems, a plurality of telematics data items that are sampled at a plurality of sample times. The one or more data processing systems can be implemented as the server 102 in FIG. 1 in some embodiments.

At step 604, the method 600 involves storing, to a hardware storage device, the one or more telematics data items. The hardware storage device can be implemented as the storage device 104 in FIG. 1 in some embodiments.

At step 606, the method 600 involves, for a given sample time, accessing, from the hardware storage device, a given telematics data item and condition data specifying one or more conditions.

At step 608, the method 600 involves determining, by the one or more data processing systems, that the given telematics data item satisfies the one or more conditions.

At step 610, the method 600 involves computing, by the one or more data processing systems, a fuel consumption amount at the given sample time.

At step 612, the method 600 involves determining, by the one or more data processing systems, a distance traveled by the vehicle from (i) a previous sample time that is prior to the given sample time, to (ii) the given sample time.

At step 614, the method 600 involves, for a plurality of telematics data items that satisfy the one or more conditions, computing, by the one or more data processing systems, a total distance and a total fuel consumption amount, with the computing based on distances traveled and fuel consumption amounts for the plurality of telematics data items.

At step 616, the method 600 involves determining, by the one or more data processing systems, a fuel efficiency score based on the total distance and the total fuel consumption amount.

Embodiments of this disclosure, in particular the features relating to the fuel efficiency score, have many advantages in practical applications. For example, the fuel efficiency score obtained according to one or more embodiments can help plan eco-friendly road infrastructure and regulate the automobile market. The fuel efficiency score can help with the design of fuel-efficient products and gain competitive advantage. The fuel efficiency score also can help with planning fuel-saving routes and evaluate a driver's fuel efficiency performance, possibly against benchmarks such as the average fuel efficiency of a group of drivers or even a larger population. In short, the eco-score derived from techniques described in this disclosure have myriad advantages and practical applications.

Figure 7:
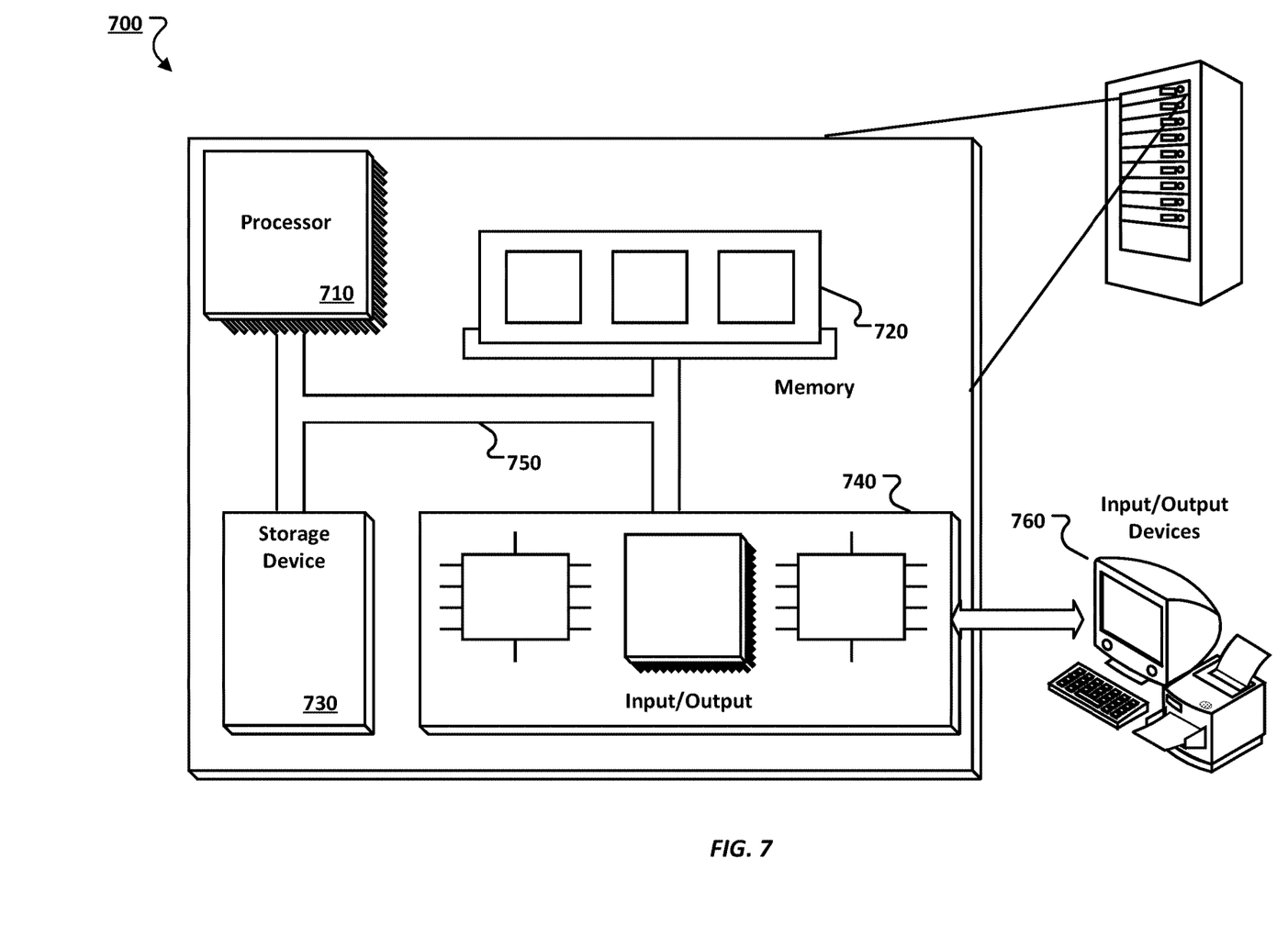

FIG. 7 is a block diagram of an example computer system 700 in accordance with embodiments. For example, referring to FIG. 1, the mobile device 108, and the server 102 can be an example of the system 700 described here, as could a computer system used by any of the users who access resources of these components. The system 700 includes a processor 710, a memory 720, a storage device 730, and one or more input/output interface devices 740. Each of the components 710, 720, 730, and 740 can be interconnected, for example, using a system bus 750.

The processor 710 is capable of processing instructions for execution within the system 700. The term "execution" as used here refers to a technique in which program code causes a processor to carry out one or more processor instructions. In some implementations, the processor 710 is a single-threaded processor. In some implementations, the processor 710 is a multi-threaded processor. The processor 710 is capable of processing instructions stored in the memory 720 or on the storage device 730. The processor 710 may execute operations such as those described with reference to other figures described herein.

The memory 720 stores information within the system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 can include, for example, a hard disk device, an optical disk device, a solid-state drive, a flash drive, magnetic tape, or some other large capacity storage device. In some implementations, the storage device 730 may be a cloud storage device, e.g., a logical storage device including one or more physical storage devices distributed on a network and accessed using a network. In some examples, the storage device may store long-term data. The input/output interface devices 740 provide input/output operations for the system 700. In some implementations, the input/output interface devices 740 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 700 to communicate, for example, transmit and receive data. In some implementations, the input/output device can include driver devices configured to receive input data and send output data to other input/output devices, e.g., keyboard, printer and display devices 760. In some implementations, mobile computing devices, mobile communication devices, and other devices can be used.

A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 700 is contained within a single integrated circuit package. A system 700 of this kind, in which both a processor 710 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 740.

Although an example processing system has been described in FIG. 7, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing system. Alternatively, or additionally, the program instructions can be encoded in/on an artificially generated propagated signal. In an example, the signal can be a machine-generated electrical, optical, or electromagnetic signal that is generated to encode information for transmission to suitable receiver system for execution by a data processing system. The computer-storage medium can be a machine-readable storage device, a machine-readable storage substrate, a random or serial access memory device, or a combination of computer-storage mediums.

The terms "data processing system," "computer," and "computing device" (or equivalent as understood by one of ordinary skill in the art) refer to data processing hardware. For example, a data processing system can encompass all kinds of system, devices, and machines for processing data, including by way of example, a programmable processor, a computer, or multiple processors or computers. The system can also include special purpose logic circuitry including, for example, a central processing unit (CPU), a field programmable gate array (FPGA), or an application specific integrated circuit (ASIC). In some implementations, the data processing system or special purpose logic circuitry (or a combination of the data processing system or special purpose logic circuitry) can be hardware- or software-based (or a combination of both hardware- and software-based). The system can optionally include code that creates an execution environment for computer programs, for example, code that constitutes processor firmware, a protocol stack, a database management system, an operating system, or a combination of execution environments. The present disclosure contemplates the use of data processing systems with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and system can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, RD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A method implemented by one or more data processing systems, comprising:
   receiving, by the one or more data processing systems, data produced by one or more telematics sensors in a vehicle, wherein the one or more telematics sensors comprise an accelerometer;
   determining, based on the data and by the one or more data processing systems, a plurality of telematics data items that are sampled at a plurality of sample times, wherein each of the plurality of telematics data items comprise a forward acceleration of the vehicle, and wherein determining the plurality of telematics data items comprises determining the forward acceleration of the vehicle based on an output of the accelerometer and an orientation of the accelerometer relative to the vehicle;

for one or more of the plurality of sample times,
    accessing, by the one or more data processing systems, a given telematics data item sampled at a given sample time;
    determining, by the one or more data processing systems, that the given telematics data item satisfies one or more data validity conditions;
    in response to determining that the given telematics data item satisfies the one or more data validity conditions, computing, by the one or more data processing systems and based on the given telematics data item, a fuel consumption amount at the given sample time; and
    determining, by the one or more data processing systems, a distance traveled by the vehicle from (i) a previous sample time that is prior to the given sample time, to (ii) the given sample time;

computing, by the one or more data processing systems, a total distance and a total fuel consumption amount, with the computing based on distances traveled and fuel consumption amounts for the plurality of telematics data items;

determining, by the one or more data processing systems, a fuel efficiency score based on the total fuel consumption amount and at least one of: the total distance; or a total time for the vehicle to travel the total distance; and providing the fuel efficiency score to the driver.

2. The method of claim 1, wherein the one or more data processing systems comprise a mobile device, the method further comprising:
    presenting, using the mobile device, at least one of: the fuel efficiency score; or an advisory message about fuel efficiency.

3. The method of claim 2, wherein the presenting occurs at the given sample time.

4. The method of claim 2, wherein the advisory message comprises at least one of:
    fuel efficiency information;
    a trend of fuel consumption over time; or
    a recommendation of adjustment of driving behavior.

5. The method of claim 1, further comprising:
    determining, by the one or more data processing systems, that the given telematics data item satisfies the one or more data validity conditions, wherein determining that the given telematics data item satisfies the one or more data validity conditions comprises:
        parsing the given telematics data item to identify a structure of the given telematics data item, with the structure specifying one or more fields of the given telematics data item;
        identifying contents of the one or more fields in the given telematics data item; and
        based on the identified contents, determining that the one or more data validity conditions are satisfied.

6. The method of claim 5, wherein the one or more data validity conditions comprise at least one of:
    the identified contents are not empty;
    the identified contents comprise a valid measurement value; or
    the identified contents comprise a valid time value.

7. The method of claim 1, further comprising:
    comparing the fuel efficiency score with a model fuel efficiency score.

8. The method of claim 1, wherein the one or more telematics sensors comprise a navigation signal receiver that measures the distance traveled by the vehicle.

9. The method of claim 1, wherein the fuel consumption amount is computed based on a model that receives a vehicle-specific parameter and the plurality of telematics data items.

10. The method of claim 9, further comprising: adjusting the model based on actual fuel consumption data.

11. The method of claim 1, wherein each telematics data item comprises: a vertical velocity of the vehicle; a forward velocity of the vehicle; and the forward acceleration of the vehicle.

12. The method of claim 1, wherein the fuel efficiency score comprises at least one of:
    a cost for the total fuel consumption amount;
    an amount of carbon dioxide emission;
    a ratio between a total time and the total fuel consumption amount;
    a ratio between the total time and the cost for the total fuel consumption amount;
    a ratio between the total time and the amount of carbon dioxide emission from the total fuel consumption amount;
    a ratio between the total distance and the total fuel consumption amount;
    a ratio between the total distance and the cost for the total fuel consumption amount; or
    a ratio between the total distance and the amount of carbon dioxide emission from the total fuel consumption amount.

13. The method of claim 1, further comprising:
    determining, by the one or more data processing systems, a correlation between the fuel efficiency score and a driving behavior; and
    providing, to the driver, a recommendation for adjustment to the driving behavior based on the determined correlation.

14. A data processing system for obtaining fuel efficiency information of a vehicle, comprising: a receiver; and a processor, wherein:
    the receiver receives data produced by one or more telematics sensors, wherein the one or more telematics sensors comprise an accelerometer;
    the processor determines, based on the data, a plurality of telematics data items that are sampled at a plurality of sample times, wherein each of the plurality of telematics data items comprise a forward acceleration of the vehicle, and wherein the processor determines the plurality of telematics data items by determining the forward acceleration of the vehicle based on an output of the accelerometer and an orientation of the accelerometer relative to the vehicle;
    the processor accesses, for one or more of the plurality of sample times, a given telematics data item sampled at a given sample time;
    the processor determines that the given telematics data item satisfies one or more data validity conditions;
    in response to determining that the given telematics data item satisfies the one or more data validity conditions, the processor computes, based on the given telematics data item, a fuel consumption amount at the given sample time;

the processor determines a distance traveled by the vehicle from (i) a previous sample time that is prior to the given sample time, to (ii) the given sample time;

the processor computes a total distance and a total fuel consumption amount; and the processor obtains a fuel efficiency score based on the total fuel consumption amount and at least one of: the total distance; or a total time for the vehicle to travel the total distance.

15. The data processing system of claim 14, wherein the processor determines that the given telematics data item satisfies the one or more data validity conditions by:

parsing the given telematics data item to identify a structure of the given telematics data item, with the structure specifying one or more fields of the given telematics data item;

identifying contents of the one or more fields in the given telematics data item; and determining, based on the identified contents, that the one or more data validity conditions are satisfied.

16. The data processing system of claim 14, wherein the processor compares the fuel efficiency score with a model fuel efficiency score.

17. The data processing system of claim 14, wherein the data processing system is in wireless communication with the vehicle and receives the data produced by the one or more telematics sensors by a wireless communications link from the vehicle, wherein the vehicle comprises the one or more telematics sensors.

18. One or more non-transitory computer-readable storage media for storing instructions, that when executed, cause a hardware processor to perform operations comprising:

receiving, by the hardware processor, data produced by one or more telematics sensors in a vehicle, wherein the one or more telematics sensors comprise an accelerometer;

determining, based on the data and by the hardware processor, a plurality of telematics data items that are sampled at a plurality of sample times, wherein each of the plurality of telematics data items comprise a forward acceleration of the vehicle, and wherein determining the plurality of telematics data items comprises determining the forward acceleration of the vehicle based on an output of the accelerometer and an orientation of the accelerometer relative to the vehicle, storing, to a hardware storage device, the plurality of telematics data items;

for one or more of the plurality of sample times, accessing, from the hardware storage device, a given telematics data item sampled at a given sample time;

determining, by the one or more data processing systems, that the given telematics data item satisfies one or more data validity conditions;

in response to determining that the given telematics data item satisfies the one or more data validity conditions, computing, by the one or more data processing systems and based on the given telematics data item, a fuel consumption amount at the given sample time; and determining, by the one or more data processing systems, a distance traveled by the vehicle from (i) a previous sample time that is prior to the given sample time, to (ii) the given sample time;

computing, by the hardware processor, a total distance and a total fuel consumption amount, with the computing based on distances traveled and fuel consumption amounts for the plurality of telematics data items; and determining, by the hardware processor, a fuel efficiency score based on the total fuel consumption amount and at least one of: the total distance; or a total time for the vehicle to travel the total distance.

* * * * *